(12) United States Patent
Gerstel

(10) Patent No.: US 11,329,862 B2
(45) Date of Patent: May 10, 2022

(54) METHOD AND SYSTEM FOR ASSIGNING RESOURCE FAILURE SEVERITY IN COMMUNICATION NETWORKS

(71) Applicant: SEDONASYS SYSTEMS LTD, Raanana (IL)

(72) Inventor: Ornan Alexander Gerstel, Herzliya (IL)

(73) Assignee: SEDONASYS SYSTEMS LTD, Raanana (IL)

(*) Notice: Subject to any disclaimer, the term of this patent is extended or adjusted under 35 U.S.C. 154(b) by 15 days.

(21) Appl. No.: 16/770,958

(22) PCT Filed: Nov. 7, 2018

(86) PCT No.: PCT/IL2018/051193
§ 371 (c)(1),
(2) Date: Jun. 9, 2020

(87) PCT Pub. No.: WO2019/135211
PCT Pub. Date: Jul. 11, 2019

(65) Prior Publication Data
US 2021/0168020 A1    Jun. 3, 2021

Related U.S. Application Data

(60) Provisional application No. 62/613,427, filed on Jan. 4, 2018.

(51) Int. Cl.
*H04L 12/24* (2006.01)
*H04L 12/751* (2013.01)
(Continued)

(52) U.S. Cl.
CPC .......... *H04L 41/064* (2013.01); *H04L 47/822* (2013.01); *H04J 14/0287* (2013.01); *H04J 2203/006* (2013.01)

(58) Field of Classification Search
None
See application file for complete search history.

(56) References Cited

U.S. PATENT DOCUMENTS

| 7,639,613 | B1 | 12/2009 | Ghannadian et al. |
| 9,712,290 | B2 * | 7/2017 | Callaghan ............. H04L 69/324 |

(Continued)

FOREIGN PATENT DOCUMENTS

| WO | WO2012041555 A1 | 4/2012 |
| WO | WO2017097356 A1 | 6/2017 |

OTHER PUBLICATIONS

Extended European Search Report dated Aug. 25, 2021 for European Patent Application No. 18898513.9, a foreign counterpart to U.S. Appl. No. 16/770,958, 114 pages.

*Primary Examiner* — Sai Aung
(74) *Attorney, Agent, or Firm* — Lee & Hayes, P.C.

(57) ABSTRACT

A method for assigning a severity to failure indications of network resources in a multilayered communication network includes in a processor, receiving one or a plurality of failure indications related to a failure of one or more network resources from a plurality of network resources in a communication network. A severity may be assigned to the one or said plurality of failure indications based on an impact on data, wherein assigning the severity includes at least one of: assigning a static severity based on a single traffic impact assessment in the communication network due to the one or more failed network resources, and assigning a dynamic severity based on continuous or periodic traffic impact assessments in the communication network due to the one or more failed network resources. The severity of the one or said plurality of failure indications may be outputted on an output device.

21 Claims, 6 Drawing Sheets

(51) Int. Cl.
    *H04L 41/0631*     (2022.01)
    *H04L 47/70*     (2022.01)
    *H04J 14/02*     (2006.01)

(56) References Cited

U.S. PATENT DOCUMENTS

| | | |
|---|---|---|
| 9,742,638 B1 | 8/2017 | McCabe et al. |
| 10,411,972 B2 * | 9/2019 | McCabe .............. H04L 41/5009 |
| 10,694,487 B2 * | 6/2020 | Birkner ............... H04W 64/003 |
| 10,785,093 B2 * | 9/2020 | Khanna ................... H04L 41/12 |
| 11,032,170 B1 * | 6/2021 | Pope ..................... H04L 43/045 |
| 2004/0007109 A1 | 4/2004 | Corson et al. |
| 2008/0040088 A1 | 2/2008 | Vankov |
| 2009/0010343 A1 | 4/2009 | Wang |
| 2017/0118119 A1 * | 4/2017 | Testicioglu ......... H04L 67/2842 |
| 2017/0155544 A1 * | 6/2017 | Khanna ................... H04L 45/22 |
| 2017/0331704 A1 * | 11/2017 | McCabe ................. G06F 11/008 |
| 2018/0359172 A1 * | 12/2018 | Yadav ................... H04L 41/147 |

* cited by examiner

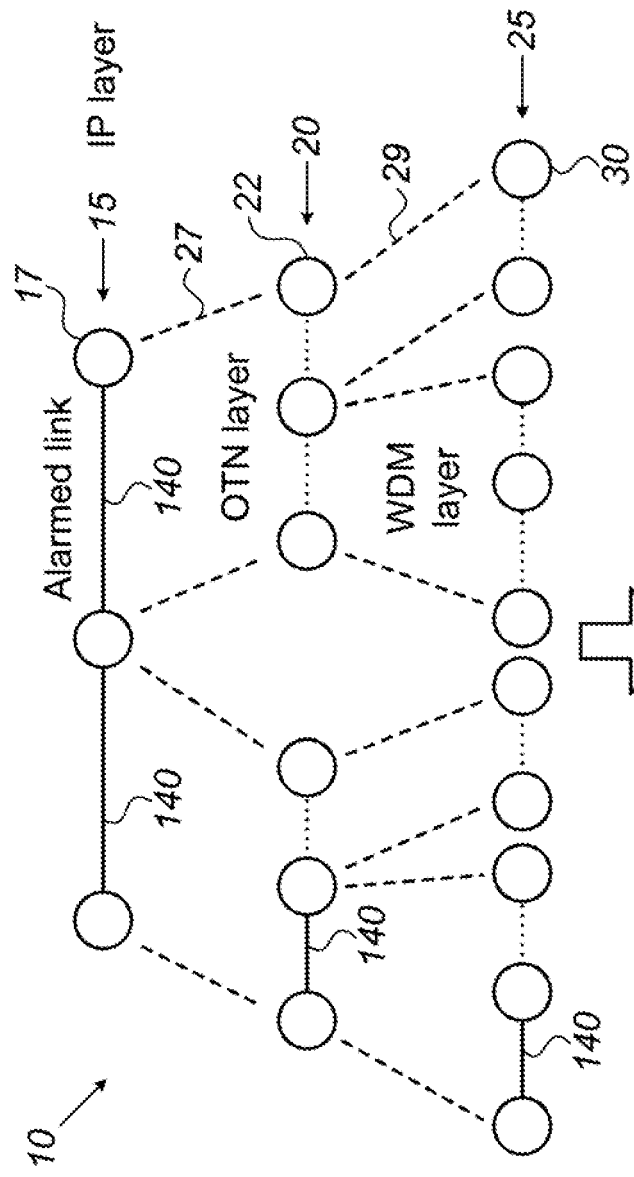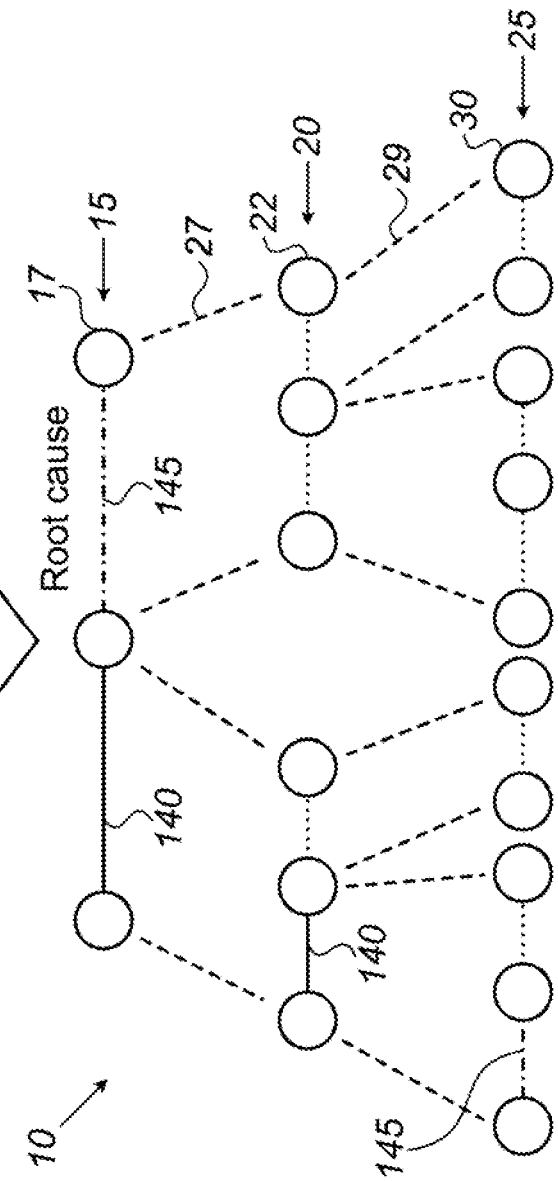
FIG. 3A
FIG. 3B

METHOD AND SYSTEM FOR ASSIGNING RESOURCE FAILURE SEVERITY IN COMMUNICATION NETWORKS

FIELD OF THE INVENTION

The present invention relates to communication networks, and particularly to assigning a severity to failure indications of network resources in a communication network.

BACKGROUND OF THE INVENTION

A communication network may include one or multiple layers of network resources, for example, an internet protocol (IP) layer, an optical transport networking layer (OTN) and an optical layer, such as a wavelength division multiplex (WDM) optical layer. The IP layer and the optical layer may also be referred to herein as the client and server layer, respectively. Network resources may include a link, a node, a line card, and an optical fiber, for example. Network services and/or network connections may be defined in the multiple network layers.

FIG. 1 schematically illustrates a multilayered communication network 10 with a vertical topology. Multilayered communication network 10 may include an IP layer 15, an optical transport networking (OTN) layers 20, and a wavelength division multiplexing (WDM) 25. IP layer 15 may include IP routers 17 connected by links 19. The optical signals in IP layer 15 may be coupled to OTN layer 20 via a vertical communication path 27, and the optical signals in OTN layer 20 may be coupled to WDM layer 25 via a vertical communication path 29. OTN layer 20 may include OTN switches 22 connected by links 24. WDM layer 25 may include WDM switches 30 connected by links 32. IP routers 17 and OTN switches 22 may typically operate in the electrical domain to route data packets and connections respectively through the network. WDM switches 30 may use photonic switching to route light paths along the multiple links 32 in WDM layer 25.

The layers, or data planes, in FIG. 1 may be arranged in a vertical topology whereby the lower layer service provisioning provides capabilities at the higher layers. Stated differently, the links in the upper layers may be supported by connections in the lower layers. For example, data packets routed through an IP router in San Francisco may appear be connected to an IP router in New York City, but the data packets from San Francisco to New York City may be routed through the OTN or WDM layers.

In the event of a failure in multiple network resources particularly in a lower level, an operator may receive a flood of network resource failure alarms in a central control station without knowledge of which failed resource is most critical for restoring normal network operation. Thus, it may be desirable to have a method and a system to help the operator assessing which of the failed network resources may be most critical.

SUMMARY OF THE INVENTION

There is thus provided, in accordance with some embodiments of the present invention, a method for assigning a severity to failure indications of network resources in a communication network may include in a processor, receiving one, or a plurality of failure indications related to a failure of one or more network resources from a plurality of network resources in a communication network. A severity may be assigned to the one or said plurality of failure indications based on an impact on data traffic in the communication network due to the one or more failed network resources from said plurality of network resources by choosing at least one of: assigning a static severity based on a single traffic impact assessment in the communication network due to the one or more failed network resources, and assigning a dynamic severity based on continuous or periodic traffic impact assessments in the communication network due to the one or more failed network resources. The severity of the one or said plurality of failure indications may be outputted on an output device.

Furthermore, in accordance with some embodiments of the present invention, the communication network may include at least two network layers.

Furthermore, in accordance with some embodiments of the present invention, assigning the severity may include correlating failures prior to an assignment of severity by identifying a minimum set of failed network resources from the one or more failed network resources that explain all other failed network resources outside of the set.

Furthermore, in accordance with some embodiments of the present invention, the impact on the data traffic may be a function of parameters selected from the group consisting of a congestion, a latency, a service diversity, and a network diversity.

Furthermore, in accordance with some embodiments of the present invention, the failure indications may include failure alarms.

Furthermore, in accordance with some embodiments of the present invention, assigning the severity may include assigning levels of severity.

Furthermore, in accordance with some embodiments of the present invention, assigning the severity may include computing a severity score.

Furthermore, in accordance with some embodiments of the present invention, assigning the static severity may include comparing the data traffic before and after the failure of the one or more network resources using the single traffic assessment.

Furthermore, in accordance with some embodiments of the present invention, assigning the dynamic severity may include comparing traffic conditions before the failure of the one or more network resources and current traffic conditions using the continuous or the periodic traffic assessments.

Furthermore, in accordance with some embodiments of the present invention, assigning the dynamic severity may include comparing the data traffic after the repairing the failure of the one or more network resources using the continuous or the periodic traffic assessments.

There is further provided, in accordance with some embodiments of the present invention, an apparatus for assigning a severity to failure indications of network resources in a communication network may include a memory and a processor. The processor may be configured to receive one or a plurality of failure indications related to a failure of one or more network resources from a plurality of network resources in a communication network, to assign a severity to the one or said plurality of failure indications based on an impact on data traffic in the communication network due to the one or more failed network resources from said plurality of network resources by choosing at least one of: assigning a static severity based on a single traffic impact assessment in the communication network due to the one or more failed network resources, and assigning a dynamic severity based on continuous or periodic traffic impact assessments in the communication network due to the one or more failed network resources, and to output the severity of the one or said plurality of failure indications on an output device.

Furthermore, in accordance with some embodiments of the present invention, the output device may include another system capable of managing and displaying the severity of the one or said plurality of failure indications related to the failure of the one or more network resources.

BRIEF DESCRIPTION OF THE DRAWINGS

In order for the present invention, to be better understood and for its practical applications to be appreciated, the following Figures are provided and referenced hereafter, it should be noted that the Figures are given as examples only and in no way limit the scope of the invention. Like components are denoted by like reference numerals.

FIG. 3A schematically illustrates multiple network resource failures, in accordance with some embodiments of the present invention;

FIG. 3B schematically illustrates failed network resources identified as root cause failures, in accordance with some embodiments of the present invention;

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating." "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

While an operator may be monitoring data traffic in multilayer communication network 10 at a central control station, for example, the operator may receive multiple network resource failure alarms indicating failures in one or more network resources. A severity may be assigned to each of the failure alarms and the severities may be output to the operator at the central control station, so as to indicate to the operator which of the failure indications may be most critical for restoring normal network operation (e.g., which failure may be fixed first, for example). Embodiments of the present invention describe herein a system and method for assigning a severity to failure indications of network resources in a communication network.

Figure 1:
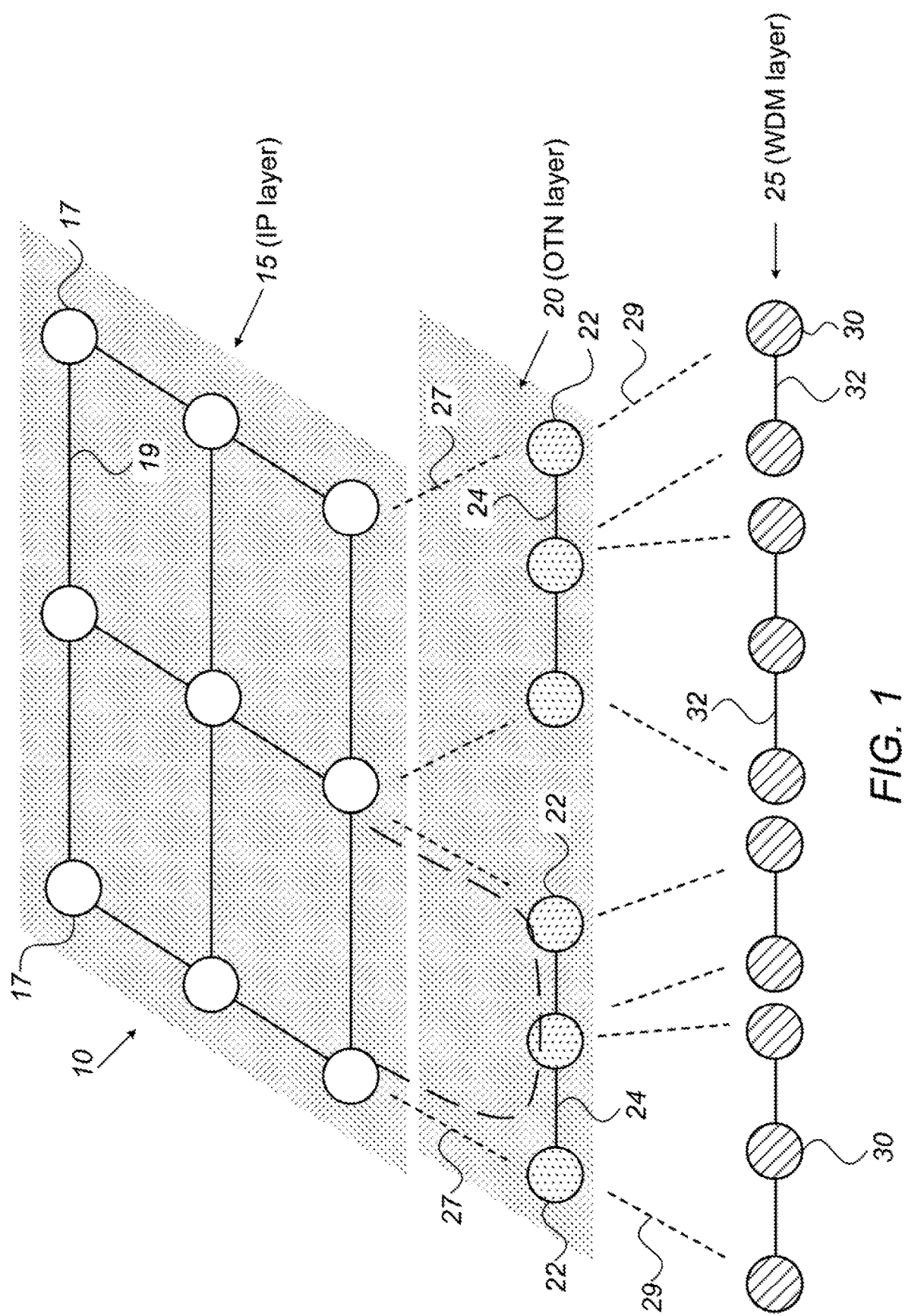
FIG. 1 schematically illustrates a multilayered communication network with a vertical topology.
Figure 2:
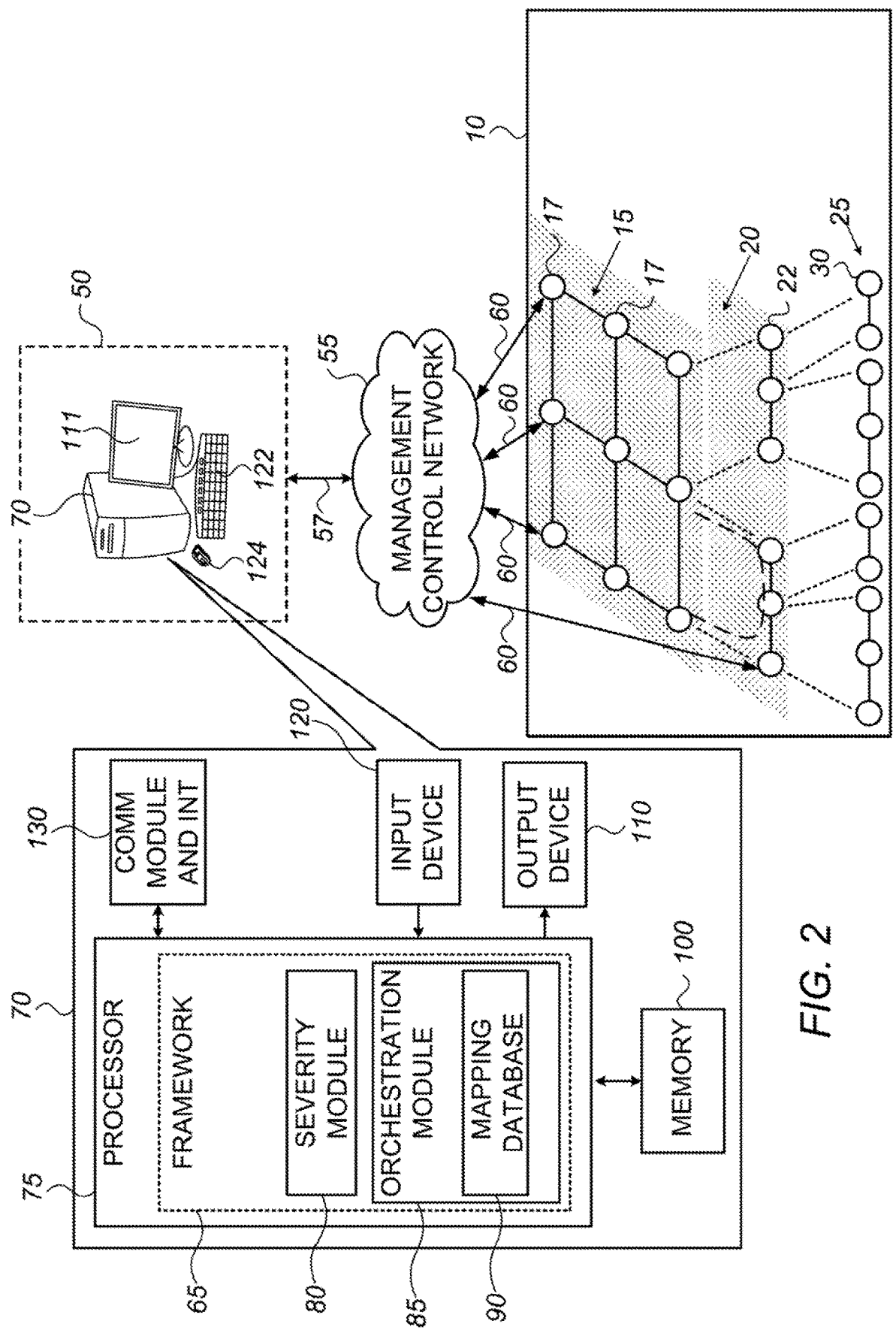
FIG. 2 schematically illustrates a system for monitoring network resources and assigning a severity to an indication of failed network resources, in accordance with some embodiments of the present invention.

FIG. 2 schematically illustrates a system 50 for monitoring network resources and assigning a severity to an indication of failed network resources, in accordance with some embodiments of the present invention. System 50 may include a server 70 which may include a processor 75 coupled to a memory 100, an input device 120, an output device 110, and a communication module and interface 130. Server 70 may be part of, or may be in communication 57 with multilayered communication network 10 through a management/control network 55 also communicating 60 with network resources such as IP routers 17, OTN switches 22, and WDM switches 30, for example, in the different network layers.

Processor 75 may include one or more processing units, e.g. of one or more computers. Processor 75 may be configured to operate in accordance with programmed instructions stored in memory 100. Processor 75 may be capable of executing an application for monitoring network resources and assigning a severity to failure indications associated with the failed network resources.

Processor 75 may communicate with output device 110. For example, output device 110 may include a computer monitor or screen. Processor 12 may communicate with a screen 111 of output device 110 to display the severity of the failure indications in the network resources. In another example, output device 110 may include a printer, display panel, speaker, or another device capable of producing visible, audible, or tactile output. In some embodiments, output device 110 may include another system capable of managing and displaying the severity of the one or said plurality of failure indications respectively related to the failure of the one or more network resources.

Processor 75 may communicate with input device 120. For example, input device 120 may include one or more of a keyboard 122, keypad, or pointing device 124 (e.g., a mouse) for enabling a user to inputting data or instructions for operation of processor 75.

Processor 75 may communicate with memory 100. Memory 100 may include one or more volatile or nonvolatile memory devices. Memory 100 may be utilized to store, for example, programmed instructions for operation of processor 75, data or parameters for use by processor 75 during operation, or results of operation of processor 75. In operation, processor 75 may execute a method for monitoring network resources and assigning a severity to an indication of failed network resources.

Server 70 may also be referred to herein as a central controller, a central control station, or a top-level controller. A framework 65 may be operating on processor 75 of server 70. The term "framework" may refer to a user-written application-specific software stored in memory 100 and executed on processor 75. Framework 65 may include a severity module 80, and an orchestration software module 85 that further includes a mapping database 90 that represents multilayered network 10, its nodes, links and traffic statistics. Furthermore, mapping database 90 may include mappings of which ports of IP routers 17 map into which ports in OTN switches 22 and WDM switches 30, for example, and vice versa. Mapping database 90 may include the entire general connectivity topology of multilayered communication network 10. Orchestration module 85 may be used for mapping service requests to available network resources in the multilayered environment and optimizing the usage of different types of network resources.

Server 70 may be located, for example, typically at one location to monitor data traffic in the network resources of multilayered communication network 10 using by a network operator via communication module and interface 130. Server 70 may be implemented within one multilayered communication network 10 operated by the network operator. Server 70 may monitor the data traffic throughout the network resources in the network operator. Framework 65 may be used to control and to monitor all aspects of the data traffic of the network operator in this exemplary embodiment.

FIG. 3A schematically illustrates multiple network resource failures, in accordance with some embodiments of the present invention. When a failure in one or more network resources 140 occurs, an operator monitoring the operation of multilayered communication network 10 may receive a failure indication, such as a failure alarm, regarding the one or more failed network resources on display 111, for example.

Furthermore, when a failure in one or more network resources in a lower layer, such as WDM layer 25, for example, the failed links affect communication layers above the communication layer with the one or more failed resources, such as in IP layer 15 and OTN layer 20. As a result, an operator may receive a flood of network resource failure indications related to network resources throughout multilayered communication network 10 making it hard for the operator to identify which of failed network resources 140 may cause the largest impact on the data traffic and which of failed network resources 140 may need to be fixed first.

In some embodiments of the present invention, system 50 may correlate failures prior to an assignment of severity by identifying a minimum set of failed network resources from the one or more failed network resources that explain all other failed network resources outside of the set.

The failed network resources in the set may also be referred to herein as root cause failures. Fixing the root cause failures first may typically be the fastest way of minimizing the largest impact in the data traffic. For example, a first failed network resource may cause a bottleneck in data traffic throughout multilayered communication network 10 even though other failed resources may be connected to the first failed network resource, e.g, the root cause failure causing the data traffic bottleneck or network congestion.

Slated differently, identifying the root cause failures may be the fastest way for the operator to pinpoint the failed network resources which had the biggest impact in the performance degradation in the communication network. As a result, the operator may use fault isolation techniques such as root cause analysis (RCA), for example, to identify specific network resource failures that caused the flood of alarms.

FIG. 3B schematically illustrates failed network resources identified as root cause failures 145, in accordance with some embodiments of the present invention. System 50 may apply root cause analysis to multilayered communication network 10 in order to find a minimum set of failed resources 145 which may be used to explain all of the failures in the one or more network resources 140 resulting in a degradation of the performance metrics (e.g., latency, network congestion) of data traffic in multilayered communication network 10.

In some embodiments of the present invention, a severity may be assigned to each of the one or more failure indications or alarms, so as to assist the operator in assessing the degradation in the performance metrics of data traffic in multilayered communication network 10 due to one or more failed resources 140. The severity of the one or more failure indications may be include any suitable metric to alert the operator as to which of the one or more failed network resources should be fixed first.

In some embodiments of the present invention, the severity may include a score such as a numerical value from 0 to 100 indicating how severe a failure may be in causing the system performance degradation with a severity score of 100 being most severe, for example.

In some embodiments of the present invention, the severity of the failure indications may include coarse levels of severity, such as critical, major, minor, or warning. For example, a "critical" severity may indicate that a severe service degradation has occurred such that immediate corrective action may be required to fix the identified subset of failed network resources from the one or more failed network resources associated with the "critical" failure severity indication. Similarly, a "major" severity may indicate that a severe service degradation has occurred such that urgent corrective action may be required to fix the identified subset of failed network resources associated with the major severity failure.

A "minor" severity may indicate that a fault condition occurred that does not cause service degradation such that corrective actions to fix the identified subset of failed network resources associated with the minor severity indication may be needed to prevent a more serious failure from occurring. Finally, a warning indicates the detection of a fault or failure in the one or more failed network resources with the potential to cause performance degradation. The type of failure in the one or more failed network resources may be critical or non-critical for assessing the severity levels depending on current data traffic and failure condition.

Figure 4C:
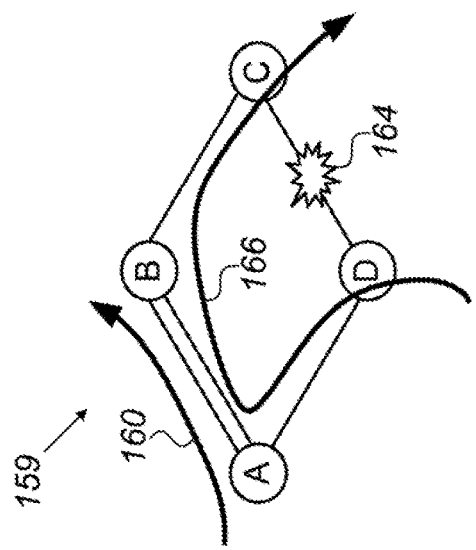
FIG. 4C schematically illustrates an exemplary communication network with a failure of non-critical severity, in accordance with some embodiments of the present invention.
Figure 4B:
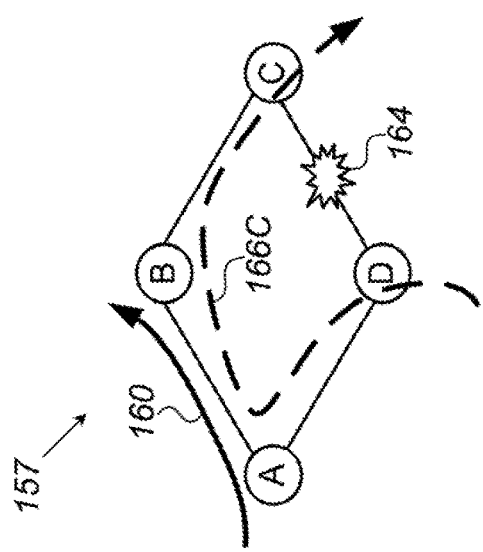
FIG. 4B schematically illustrates an exemplary communication network with a failure of critical severity, in accordance with some embodiments of the present invention.
Figure 4A:
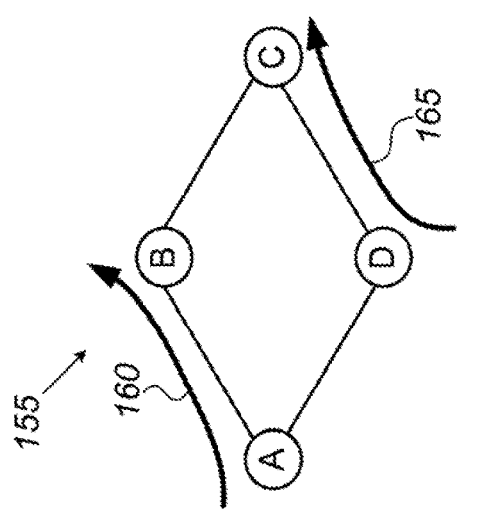
FIG. 4A schematically illustrates an exemplary communication network with normal data traffic, in accordance with some embodiments of the present invention.

FIG. 4A schematically illustrates an exemplary communication network 155 with normal data traffic, in accordance with some embodiments of the present invention.

FIG. 4B schematically illustrates an exemplary communication network 157 with a failure 164 of critical severity, in accordance with some embodiments of the present invention.

FIG. 4C schematically illustrates an exemplary communication network 159 with failure 164 of non-critical severity, in accordance with some embodiments of the present invention.

FIG. 4A illustrates normal data traffic over data traffic flow path 160 from node A to B and data traffic flow path 165 from node D to C. In a first exemplary case with reference to FIGS. 4A and 4B shown here merely for conceptual clarity and not by way of limitation of the embodiments of the present invention, suppose each link may support 10 Gb/s maximum data rates, and suppose data traffic How paths 160 and 165 each support 6 Gb/s, for example. If a failure 164 occurs in this case, the 6 Gb/s data traffic from path 165 may then be rerouted to path 166C (e.g., from node D to node A to node B to node C). Hence, failure 164 is a critical failure 164 because the system attempts to reroute the 6 Gb/s data traffic from node A to node B which already has 6 Gb/s data traffic but can only support a maximum of 10 Gb/s, and not 12 Gb/s. This may result in degraded performance due to network congestion and/or higher latencies.

In a second exemplary case with reference now to FIGS. 4A and 4C shown here merely for conceptual clarity, suppose each link may support 10 Gb/s maximum data rates, and suppose data traffic flow paths 160 and 165 each support 4 Gb/s, for example. If a failure 164 occurs in this case, the 4 Gb/s data traffic from path 165 may then be rerouted to path 166. This is the same failure in the same network topology as shown in FIG. 4B except that in this case, failure 164 is a non-critical failure because the system attempts to reroute the 4 Gb/s data traffic from node A to node B, which already has 4 Gb/s data traffic, but may support a maximum of 10 Gb/s, so there is no congestion. In this exemplary case, there is now 8 Gb/s from node A to node B, and no resultant system performance degradation. Hence, in comparing the exemplary embodiments shown for FIGS. 4A-4C, even for the same failure 164 in the same network, the severity may be critical (FIG. 4B) or may be benign (FIG. 4C) under different traffic conditions as explained herein above.

In some embodiments of the present invention, failure indications or alarms may include varying severity or "true severity" to reflect the actual impact of the failures on the data traffic as opposed to a static severity. The severity level of the failure alarms may be static or dynamic. Additionally, in some embodiments, failure indications or alarms may also be a fixed severity. The fixed severity may be defined by the vendor, or network operator, and may be unrelated to the actual impact of the failures.

Static severity may be assessed where system 50 monitors the plurality of network resources and compares the data traffic just before and after a failure. System 50 may then assign a static severity based on a single traffic impact assessment in the communication network due to the one or more failed network resources. In some embodiments, system 50 may assign a static severity to one or more alarms generated as a result of a root cause failure and based on vendor definitions of severity in system 50. In other embodiments, system 50 may assign severity to the one or more alarms at the time of a failure based on the traffic conditions at the time of the failure.

Dynamic severity may be assessed where system 50 may continuously monitor the data traffic in the plurality of network resources, or periodically monitor the data traffic in the plurality of network resources at recurrent predefined time intervals. System 50 may continue to compare the monitored data traffic just before and after a failure. In some embodiments, system 50 may compare traffic conditions before the failure of the one or more network resources and current traffic conditions using the continuous or the periodic traffic assessments.

In some embodiments, system 50 may continue to compare the monitored data traffic after failed network resources are repaired, for example. In other embodiments, system 50 may continue to compare the monitored data traffic as network conditions change even if the failed network resources are not repaired, for example. System 50 may then assign a dynamic severity based on continuous traffic impact assessments in the communication network due to the one or more failed network resources.

In some embodiments of the present invention, static severity may be assigned at the time of a failure in one or more network resources. At the time of failure, an assessment may be made on the impact of the failure on the data traffic parameters such as network congestion and/or service latency. These parameters may be compared to the network/service policy of an organization or business, for example, using multilayered communication network 10. System 50 may also assign a static severity depending on the performance impact when the failure occurs. The assigned static severity does not change.

In some embodiments of the present invention, system 50 may assign a static severity to each of the failure indications related to the one or more failed network resources by identifying a root cause of the failure. The root cause failure may be defined herein at least one failed network resource, or a set failed network resources, or a minimal set of failed network resources from the one or more failed network resources, which have largest impact on the data traffic due to their failure relative to the impact due to each of the other failed network resources from the one or more failed network resources (e.g., the failed network resources outside of the set).

In some embodiments of the present invention, system 50 (e.g., severity module 80) may assess data traffic conditions in multilayered communication network 10 after the failure. Severity module 80 may then assess the effect on multilayered communication network 10 when the root cause is fixed. Severity module 80 may assess effect of fixing the root cause by simulating the IP layer behavior and/or by looking at the historical repository of the network state stored in memory 100. The historical repository may be a collection of network states that may have been saved periodically in the past, for example, by saving the current network state in the repository periodically with a predefined duration, such as every X minutes, for example, where X may be any number.

In some embodiments of the present invention, system 50 may assign the severity of a failure alarm based on the difference in the sampled traffic conditions before and after the failure, based on the difference in the sampled traffic conditions before and after fixing the root cause failure, or both.

In some embodiments of the present invention, system 50 (e.g., severity module 80) may assess the impact of a failure by comparing the recorded network state before the failure to the network state after the failure. In other embodiments, if the network state was not recorded before the failure, then the impact of the failure may be assessed by reconstructing it by recording the traffic conditions right after the failure and by simulating the behavior of the network without the failure.

In some embodiments of the present invention, the impact of a failure in the one or more network resources on the data traffic in traffic multilayered communication network 10 may be a function of performance parameters: congestion, latency, service diversity and network diversity. Network congestion assesses how much data traffic is lost due to the failure. Latency assesses how much of the latency sensitive traffic may violate the latency specification due to the failure in the one or more networks.

Service diversity assesses how much of the traffic that must be diverse is no longer diverse due to the failure. For example, if data traffic from a particular source is routed over two data paths and network resources in one of the two data traffic paths fail, there is a loss in service diversity since there is only one data traffic path due to the failure. Network diversity assesses if the network may be at risk of a complete disconnection, or catastrophic failure, due to the failure in the one or more network resources.

In some embodiments of the present invention, the impact of a failure in the one or more network resources on the data traffic in traffic, multilayered communication network 10 may be further assessed by aggregate network conditions, such as a change in the state of a tunnel label-switch path (LSP), for example. In other embodiments, the impact of the failure may be further assessed based on the level of customer service and service level agreements (SLA).

As an exemplary scenario, suppose that the network operator has a service level agreement (SLA) with a bank, for example, to relay the data related to the bank's business over multilayered communication network 10 with a latency less than a predefined latency threshold. Furthermore, the SLA may stipulate that if the latency rises above the predefined threshold over a predefined time interval, for example, the service provider may be obligated to pay very large penalties to its customer (e.g., the bank) as compensation.

Now suppose that one or more network resources fail in multilayered communication network 10. A failure in a set of failed network resources from among the one or more failed resources in the network may cause the latency in relaying the bank's data in multilayered communication network 10 to rise above the predefined threshold latency as stipulated in the SLA. In response, system 50 may assign the severity of the failure indication alarm associated with the set of failed network resources as critical since these network resource failures may result in extremely large financial penalties for the network operator in accordance with the SLA.

In some embodiments, framework 65 in system 50 may include software in severity module 80 as shown in FIG. 2, so as to evaluate data traffic conditions and performance based on failures of one or more network resources in multilayered communication network 10 and to assign a severity to each of the failure indications based on the evaluations. Severity module 80 may run various algorithms for assessing a severity of the failure indications or alarms.

In some embodiments of the present invention, severity module 80 may compute a severity score, or grade, based on a linear combination of user-configured coefficients. The severity score may also include the SLA penalties to be paid to the customer by the service provider in accordance with the SLA. The severity score may be given by Equation (1):

$$\text{Severity(failure)} = A*\text{CongestionImpact(failure)} + B*\text{LatencyImpact(failure)} + C*\text{DiversityImpact(failure)} \quad (1)$$

where coefficients A, B, C may arbitrary factors between 0 and 1 that indicate the relative importance the operator of system 50 may place on the three areas of failure impact (e.g., congestion, latency and diversity). These parameters may be fixed by the operator. CongestionImpact(failure) is a function returning a number that indicates by how much the congestion was worsened by the failure.

$$\text{CongestionImpact(failure)} = \text{sum over all network links}(\text{Congestion(failure, link)})/(\text{NormalCongestion(link)}) \quad (2)$$

where Congestion(failure, link) is the amount of traffic (in Megabits/second) that may be lost to congestion of a "link" caused by a failure "failure", where the associated variable names are given by "link" and "failure". NormalCongestion(link) is the amount of traffic (in Mb/s) lost due to congestion of link "link" when no failure is present.

Similarly, LatencyImpact(failure) is a function returning a number that indicates by how much the latency was degraded by the failure.

$$\text{LatencyImpact(failure)} = \text{Sum over all network connections}(\text{Latency(failure, connection)}/\text{NormalLatency(connection)}) \quad (3)$$

where Latency(failure, connection) is the total latency (in msec) of a network connection "connection" under failure "failure". NormalLatency(connection) is the total latency (in msec) of a network connection "connection" when no failure is present. In some embodiments, a network connection may be a labeled switched path, for example, in an Internet Protocol/Multiprotocol Label Switching (IP/MPLS) network.

Similarly, DiversityImpact(failure) is a function returning a number that indicates by how much diversity was degraded by the failure and defined by:

$$\text{DiversityImpact(failure)} = \text{Diversity(failure)}/\text{NormalDiversity} \quad (4)$$

where Diversity(failure) is the number of network connections requiring diversity in the network that are actually diverse under failure "failure". NormalDiversity is the number of network connections requiring diversity in the network that are actually diverse when no failure is present.

In some embodiments of the present invention, many variants of Equations (1)-(4) may be used. For example, the same equations (1)-(4) defined above may include modified terms of CongestionImpact(failure), LatencyImpact(failure), and DiversityImpact(failure) with the following definitions: CongestionImpact(failure) may be the total number of services that may support the required bandwidth in accordance with the SLA under a failure, less the same metric under normal conditions. LatencyImpact(failure) may be the total number of services that have a higher latency than the latency specified in the SLA under a failure, less the same metric under normal conditions. DiversityImpact(failure) may be the total number of services that violate their diversity requirement as specified in the SLA under a failure, less the same metric under normal conditions.

Figure 5:
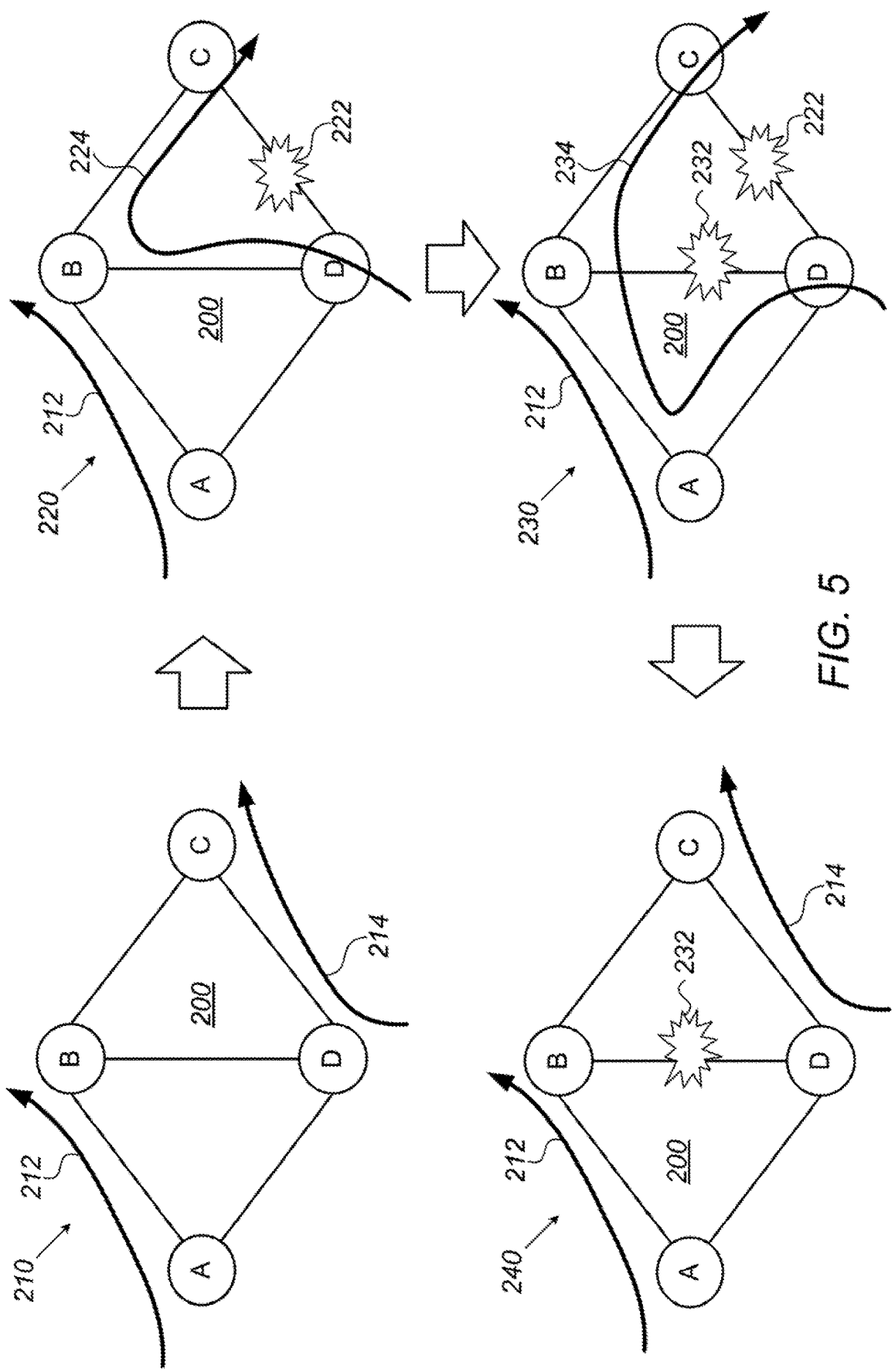
FIG. 5 schematically illustrates an exemplary communication network with a sequence of two network resource failures, in accordance with some embodiments of the present invention.

FIG. 5 schematically illustrates an exemplary communication network 200 with a sequence of two network resource failures, in accordance with some embodiments of the present invention. Exemplary communication network 200 may be used to first analyze a scenario in which static severity may be applied to the sequence of two failure alarms related to two respective network resource failures one after the other followed by a repair of one of the failed network resources, in contrast, an analysis on the same communication network of FIG. 5 is considered where dynamic severity may be applied to the sequence of two failure alarms for two respective network resources failures one after followed by a repair of one of the failed network resources.

Considering the first case of static severity, communication network 200 is shown in a normal operation state 210 where a first data traffic may be routed over a first path 212 from node A to B, and a second data traffic may be routed over a second path 214 from node D to node C.

When a first failure 222 occurs as shown in a first failure state 220 of communication network 200, system 50 may assign a static severity minor alarm to first failure 222 as the second data traffic is rerouted over a third data path 224. In this case, however, with the data traffic now routed over first path 212 and over third path 224 from node D to node B to node C, communication system 200 does not exhibit performance degradation, such as network congestion and/or out-of-spec latencies, for example.

When a second failure 232 occurs as shown in a second failure state 230 of communication network 200, system 50 may assign a static severity major alarm to second failure 232 as the second data traffic is rerouted over a fourth data path 234 from node D to node A to node B to node C since the data traffic flowing may now experience severe traffic congestion in exemplary communication network 200. The alarm associated with first failure 222 is still flagged, however, as minor (static) severity, even though the data traffic in second failure state 230 experiences severe traffic congestion. In this case, however, the alarm on first failure 222 should be now flagged as major, but it is not in cases where static severity definitions may be used.

Finally, as first failure 222 is repaired and the alarm associated with first failure 222 is cleared as shown in a first failure repair state 240, the data traffic now resumes via first data path 212 and second path 214 as in a normal operation state 210 even though second failure 232 is still present and the static severity of the alarm associated with second failure 232 is still major. In this case, the severity of the alarm associated with second failure 232 should be reduced to minor since there are no problems in data traffic, but it remains as severe where static severity definitions may be used.

In some embodiments of the present invention, severity module 80 may use static severity models, wherein the same severity level may be applied to all of the failed network resources independent of traffic conditions before and after the failure.

In some embodiments of the present invention, system 50 may be configured to evaluate the status and network performance (e.g., network traffic) continuously or periodically at predefined time intervals, so as to dynamically update the severity status of the alarms associated with the one or more network resource failures based on current network conditions as well as the changing data traffic conditions and multiple network resource failures. In some embodiments, the severity may be reevaluated and updated based on how much improvement in network performance may be achieved if a particular network resource failure is fixed.

System 50 using severity module 80 and mapping database 90, for example, may assign severity levels to one or more failure indications (e.g., alarms) associated with the one or more network resource failures by finding root cause failures 145 among network resource failures 140 as shown in FIG. 3B. System 50 (e.g., processor 75) may then assess current data traffic conditions in multilayered communication network 10 after the failure.

Severity module 80 may simulate, for example, the effect of fixing each of the failed network resources. Severity module 80 may then be, used to update the severity of the alarm associated with a failed network resource by comparing the traffic conditions after the failure and the simulated the IP layer behavior if the failed network resource would be fixed. The severity of each alarm may be dynamically updated over the one or more failed network resources in this manner. Furthermore, the severity may be updated after measuring the traffic conditions after fixing the failed network resource instead of simulating the performance after fixing the failed network resource.

Now consider the scenario in FIG. 5 where severity module 80 may use dynamic severity algorithms to assess two network failures 222 and 232 in exemplary communication network 200. When a minor alarm may be assigned to first failure 222 since there is little or no impact on data traffic in communication network 200. However when second failure 232 occurs and severity module 80 in system 50 detects that there may be a severe performance degradation in network traffic, severity module 80 may then assign a major severity alarm to both first failure 221 and second failure 232 as shown in first failure state 220 and second failure state 230. Similarly, in first failure repair state 240 as first failure 222 is repaired and the network congestion is abated in communication network 200, the severity of the alarm associated with second failure 232 may be dynamically downgraded to minor.

In some embodiments of the present invention, the severity due to failure indications may be dynamically changed in a response to changes in traffic conditions throughout the day. For example, consider an exemplary embodiment in a scenario where multilayered communication network 10 may be geographically located in a large metropolitan area encompassing a business district and a residential area therein. Suppose there may be network failures both in network resources in the business district and a network failure in network resources in the residential area of the metropolitan area. During the business day, the failed network resources may severely degrade the data traffic due to the businesses in the business districts such as when banks and security exchanges, for example, are operating, whereas the data traffic in the residential area may be minorly impacted. However in the evening, the businesses in the business district are closed so even though the failed network resources in the business district may not have been repaired, the severity level of these failed network resources during the day may be flagged as critical, but during the night may be flagged as minor when applying dynamic severity.

Similarly, as everyone in the business districts goes home to the residential area, whereas the severity assigned to the failed network resources in the residential area may be minor, during the night may be reassessed as critical as people in the residential areas now try to stream and/or downloaded their favorite movies and/or entertainment shows online, for example, driving the data traffic conditions in the residential area into congestion conditions and/or high latency due to increased consumer data traffic in the evening.

In some embodiments, even without network resource failures, some network resources may not be designed or configured to handle the data traffic (e.g., network protection capacity) as the number of subscribers and their associated data traffic may increase over time. For example, the increased data traffic from an increased number of subscribers using multilayered communication network 10 may cause system 50 to issue failure alerts with associated severity levels on network resources, which are not able to handle the increased data traffic as if they failed. Again, these protection capacity failure alerts may also occur as a function of the time of day. These protection capacity failure alerts may also indicate to the network operator to upgrade the network resources in the communication network so as to handle the increased data traffic.

In some embodiments of the present invention, system 50 may be configured to reroute data traffic over different network resource over different data paths in multilayered communication network 10 in response to severity levels of failed network resources, so as to dynamically reduce the degradation of data traffic due to the one or more failed network resources.

In some embodiments of the present invention, severity module 80 may dynamically assign dependent alarms to network resource failures that are not root cause failures. In some embodiments where the root cause failure is not immediately repairable, the severity of the dependent alarms may be elevated to major or critical such that the operator may know which failure to fix first. For example, consider a scenario where a tractor plowing a field mistakenly cuts through an optical fiber backbone of multilayered communication network 10 in wavelength division multiplexing (WDM) layer 25 buried in the field, which cannot be immediately repaired. Hence, system 50 may trigger major or high severity alarms on other network resources to allow system 50 to reroute the data traffic in network resources around the cut optical fiber instead of triggering an alarm associated with the cut optical fiber itself. These severity levels may alert the operator of system 50 as to which network resources to deal with first, so as to minimize the overall system-level performance impact in multilayered communication network 10 due to the failure (e.g., the cut optical fiber in this exemplary scenario).

In some embodiments of the present invention, equations (1)-(4) may apply a fixing factor or associated mathematical models to account for the effect of fixing a failed resource in the congestion, latency and diversity terms. In other embodiments, fixing factor may account for fixing one or more failed resources and their change in the traffic conditions due to fixing the one or more failed resources (e.g., a multi-resource failure and fixing the multiple failed resources). In yet other embodiments, severity module 80 may assess dynamic severity by using mapping database 90 to understand how the data traffic may be rerouted in response to a failure, or in response to fixing a failure, or both.

In some embodiments of the present invention, severity module 80 may be used to analyze which failures are more critical by looking at the impact on data traffic before and after the failure of the one or more network resources. In other embodiments, severity module 80 may assess a difference in the data traffic after a failure of one or more network resources and the projected data traffic after fixing the one or more failed network resources. In yet other embodiments, severity module 80 may assess the difference in the data traffic after a failure of one or more network resources and the projected data traffic after fixing the one or more failed network resources based on consumer data traffic and/or business data traffic projections (e.g., service level agreements).

Figure 6:
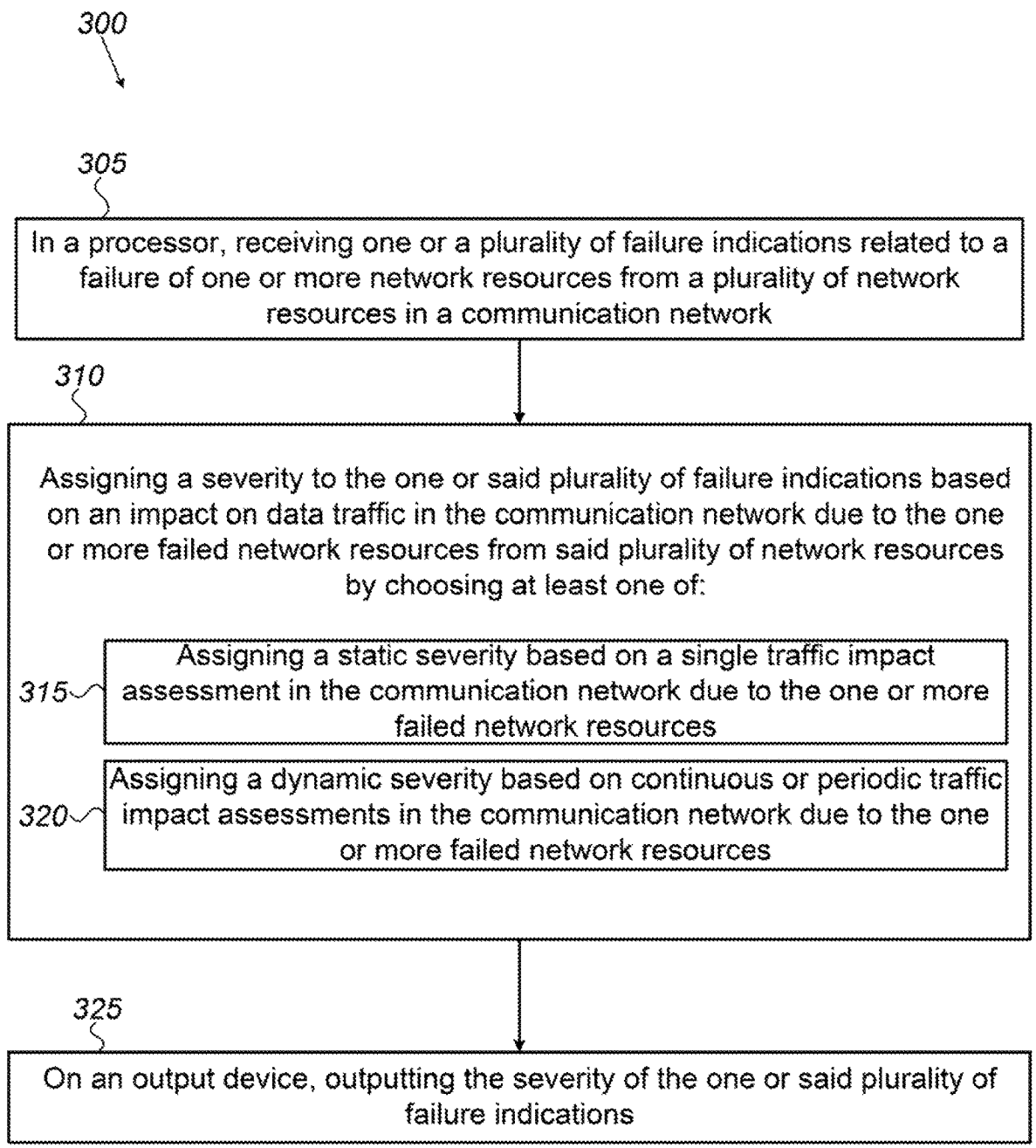
FIG. 6 is a flowchart depicting a method for assigning a severity to a failed network resource indication in a communication network, in accordance with some embodiments of the present invention.

FIG. 6 is a flowchart depicting a method 300 for assigning a severity to a failed network resource indication in a communication network, in accordance with some embodiments of the present invention. In the Example of FIG. 6, method 300 may be executed by processor 75 of system 50.

Method 300 may include receiving 305 one or a plurality of failure indications related to a failure of one or more network resources from a plurality of network resources in a communication network.

Method 300 may include assigning 310 a severity to the one or said plurality of failure indications based on an impact on data traffic in the communication network due to the one or more failed network resources from said plurality of network resources by choosing at least one of: assigning 315 a static severity based on a single traffic impact assessment in the communication network due to the one or more failed network resources, and assigning 320 a dynamic severity based on continuous or periodic traffic impact assessments in the communication network due to the one or more failed network resources.

Method 300 may include outputting 325 the severity of the one or said plurality of failure indications on output device 110. In some embodiments, output device 110 may include another system capable of managing and displaying the severity of the one or said plurality of failure indications (e.g., alarms, for example) related to the failure of the one or more network resources.

In some embodiments of the present invention, the communication network may include at least two network layers.

In some embodiments of the present invention, assigning the severity may include correlating failures prior to an assignment of severity by identifying a minimum set of failed network resources from the one or more failed network resources that explain all other failed network resources outside of the set.

In some embodiments of the present invention, the impact on the data traffic is a function of parameters selected from the group consisting of a congestion, a latency, a service diversity, and a network diversity (e.g., see equations (1)-(4)).

In some embodiments of the present invention, the failure indications may include failure alarms.

In some embodiments of the present invention, assigning the severity may include assigning levels of severity.

In some embodiments of the present invention, as ginning the severity may include computing a severity score.

In some embodiments of the present invention, assigning the static severity may include comparing the data traffic before and after the failure of the one or more network resources using the single traffic assessment.

In some embodiments of the present invention, assigning the dynamic severity may include comparing traffic conditions before the failure of the one or more network resources and current traffic conditions using the continuous or the periodic traffic assessments.

In some embodiments of the present invention, assigning the dynamic severity may include comparing the data traffic after the repairing the failure of the one or more network resources using the continuous or the periodic traffic assessments.

In some embodiments of the present invention, output device 110 may include another system capable of managing and displaying the severity of the one or said plurality of failure indications related to the failure of the one or more network resources.

It should be understood with respect to any flowchart referenced herein that the division of the illustrated method into discrete operations represented by blocks of the flowchart has been selected for convenience and clarity only.

Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as hill within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all, such modifications and changes as fall within the true spirit of the invention.

The invention claimed is:

1. A method for assigning a severity to failure indications of network resources in a communication network, the method comprising:
   in a processor, receiving one or a plurality of failure indications related to a failure of one or more network resources from a plurality of network resources in a communication network;
   assigning a severity to the one or said plurality of failure indications based on an impact on data traffic in the communication network due to the failure of the one or more network resources from said plurality of network resources, the assigning comprising at least one of:
      assigning a static severity based on a single traffic impact assessment in the communication network due to the one or more failed network resources, or
      assigning a dynamic severity based on continuous or periodic traffic impact assessments in the communication network due to the failure of the one or more network resources;
   determining an action to remedy the failure of the one or more network resources based at least in part on the severity assigned to the one or said plurality of failure indications; and
   outputting an indication of the severity of the one or said plurality of failure indications, the action to remedy the failure of the one or more network resources, and a projected outcome of the action to an administrative device.

2. The method according to claim 1, wherein the communication network comprises at least two network layers.

3. The method according to claim 1, wherein assigning the severity comprises correlating failures prior to an assignment of severity by identifying a minimum set of failed network resources from the failure of the one or more network resources that explain all other failed network resources outside of the set.

4. The method according to claim 1, wherein the impact on the data traffic is a function of parameters selected from the group consisting of a congestion, a latency, a service diversity, and a network diversity.

5. The method according to claim 1, wherein the failure indications comprise failure alarms.

6. The method according to claim 1, wherein assigning the severity comprises assigning levels of severity.

7. The method according to claim 1, wherein assigning the severity comprises computing a severity score.

8. The method according to claim 1, wherein assigning the static severity comprises comparing the data traffic before and after the failure of the one or more network resources using the single traffic impact assessment.

9. The method according to claim 1, wherein assigning the dynamic severity comprises comparing traffic conditions before the failure of the one or more network resources and current traffic conditions using the continuous or the periodic traffic impact assessments.

10. The method according to claim 1, wherein assigning the dynamic severity comprises comparing the data traffic after repairing the failure of the one or more network resources using the continuous or the periodic traffic impact assessments.

11. An apparatus for assigning a severity to failure indications of network resources in a communication network, the apparatus comprising:
   a memory; and
   a processor configured to:
   receive one or a plurality of failure indications related to a failure of one or more network resources from a plurality of network resources in a communication network;
   assign a severity to the one or said plurality of failure indications based on an impact on data traffic in the communication network due to the failure of the one or more network resources from said plurality of network resources, the assigning comprising at least one of:
      assigning a static severity based on a single traffic impact assessment in the communication network due to the one or more failed network resources, or
      assigning a dynamic severity based on continuous or periodic traffic impact assessments in the communication network due to the failure of the one or more network resources;
   determine an action to remedy the failure of the one or more network resources based at least in part on the severity assigned to the one or said plurality of failure indications; and
   output an indication of the severity of the one or said plurality of failure indications, the action to remedy the failure of the one or more network resources, and a projected outcome of the action to an administrative device.

12. The apparatus according to claim 11, wherein the communication network comprises at least two network layers.

13. The apparatus according to claim 11, wherein the processor is configured to assign the severity by correlating failures prior to an assignment of severity by identifying a minimum set of failed network resources from the failure of the one or more failed network resources that explain all other failed network resources outside of the set.

14. The apparatus according to claim 11, wherein the impact on the data traffic is a function of parameters selected from the group consisting of a congestion, a latency, a service diversity, and a network diversity.

15. The apparatus according to claim 11, wherein the failure indications comprise failure alarms.

16. The apparatus according to claim 11, wherein the processor is configured to assign the severity by assigning levels of severity.

17. The apparatus according to claim 11, wherein the processor is configured to assign the severity by computing a severity score.

18. The apparatus according to claim 11, wherein the processor is configured to assign the static severity by comparing the data traffic before and after the failure of the one or more network resources using the single traffic impact assessment.

19. The apparatus according to claim 11, wherein the processor is configured to assign the dynamic severity by comparing traffic conditions before the failure of the one or more network resources and current traffic conditions using the continuous or the periodic traffic impact assessments.

20. The apparatus according to claim 11, wherein the processor is configured to assign the dynamic severity by comparing the data traffic after repairing the failure of the one or more network resources using the continuous or the periodic traffic impact assessments.

21. The apparatus according to claim 11, wherein the administrative device comprises another system capable of managing and displaying the severity of the one or said plurality of failure indications related to the failure of the one or more network resources.

* * * * *